United States Patent [19]
Scheda

[11] 3,764,860
[45] Oct. 9, 1973

[54] METAL DETECTOR AND CHECKING ARRANGEMENT THEREFOR

[75] Inventor: Gerhard Scheda, Aachen, Germany

[73] Assignee: Dr. Hans Boekels & Co., Aachen, Germany

[22] Filed: Nov. 29, 1971

[21] Appl. No.: 202,790

[30] Foreign Application Priority Data
Nov. 30, 1970 Germany............... P 20 58 754.6

[52] U.S. Cl. .............................. 317/146, 340/258 B
[51] Int. Cl. ............................................ G08b 13/26
[58] Field of Search ................... 340/258 B, 258 C; 317/146, DIG. 2

[56] References Cited
FOREIGN PATENTS OR APPLICATIONS
56,863  7/1967  Germany Primary Examiner—J. D. Miller
Assistant Examiner—Harry E. Moose, Jr.
Attorney—Walter Becker

[57] ABSTRACT

An arrangement for detecting metal articles in a moving stream of nonmetallic material in which an emitter coil establishes a field linking a receiver coil and through which field the material moves so metal objects change the field. Changes in the field generate a signal which operates a signalling device. A checking coil is provided to which pulses are supplied periodically and the field from the checking coil changes the field at the receiver coil. A second signalling device is provided under the joint control of the pulse supply for the checking coil and the signal emitted by the receiver coil and which produces a signal indicating faulty operation whenever a pulse is supplied to the checking coil and no pulse is emitted by the receiver coil.

7 Claims, 2 Drawing Figures

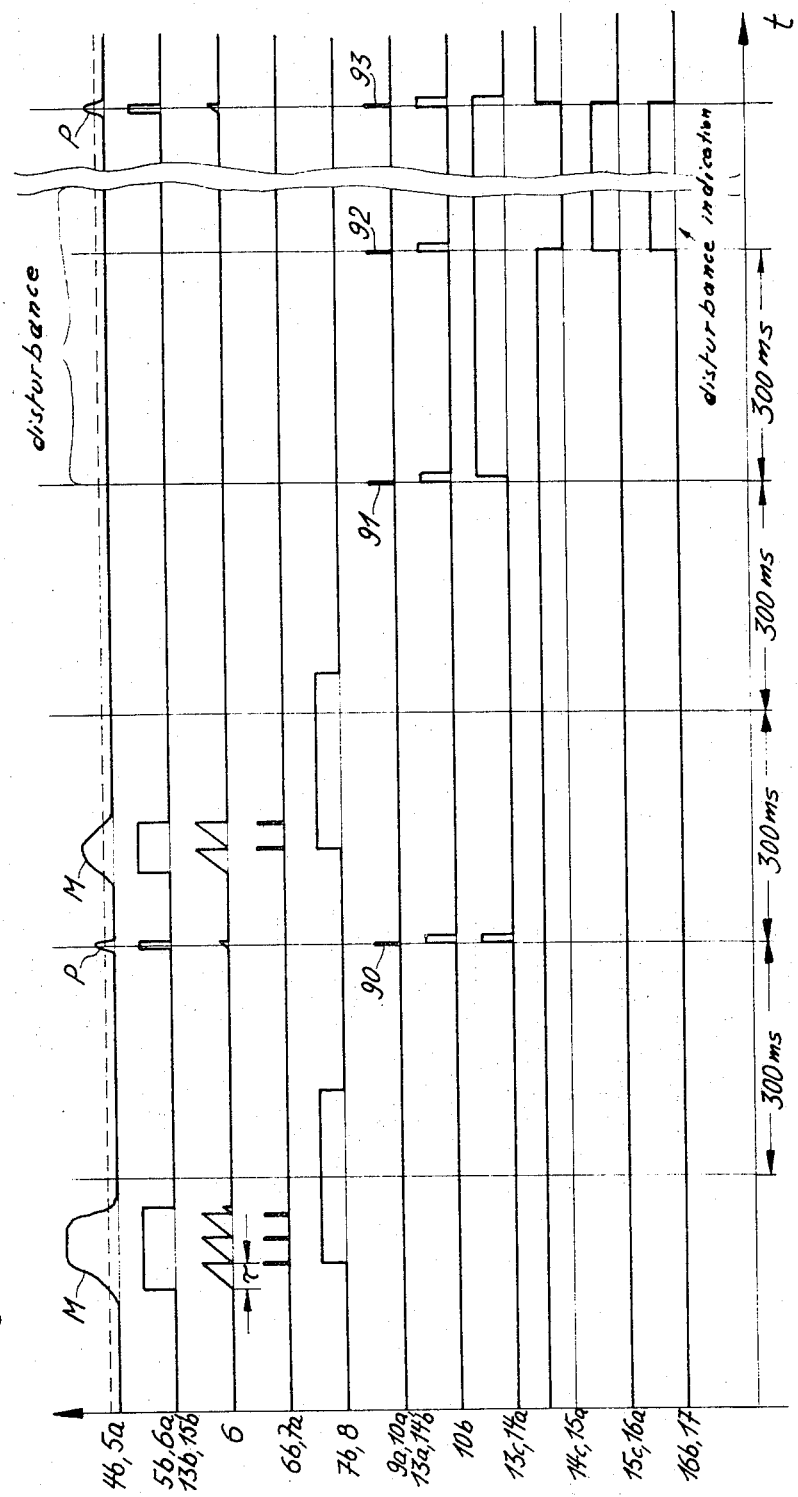

METAL DETECTOR AND CHECKING ARRANGEMENT THEREFOR

The present invention concerns a control arrangement for a metal detecting device used in connection with material being moved which comprises an emitter coil and at least one receiver coil and furthermore provided with a checking coil in the region of the emitter and receiver coils, while in the circuit of the checking coil there is located a periodically operated switch the actuation of which will in response to an insufficient sensitivity of the metal detecting device release means for indicating a disorder. A circuit of this type has been described, for instance, in the German Democratic Republic Pat. No. 56 863.

One of the drawbacks of the above mentioned heretofore known circuit or control arrangement consists in that the checking of the sensitivity of the metal detecting device is not effected continually but at major time intervals, for instance, at intervals of one hour. As a result thereof, there exists the possibility that if the drop in the sensitivity of the metal detecting device is not recognized in time, metal objects in the material or goods moved, for instance, continuously on a conveyor belt will remain undetected. The various drawbacks inherent thereto are obvious and therefore do not have to be enumerated.

It is, therefore, an object of the present invention to provide an arrangement which for all practical purposes will carry out the checking of the sensitivity of the metal detecting device in a continuous way so that any decrease in the sensitivity of the detecting device will immediately be recognized.

This object and other objects and advantages of the invention will appear more clearly from the following specification in connection with the accompanying drawings, in which:

FIG. 2 represents a pulse plan for explaining the function of the circuit according to the invention.

Figure 1:
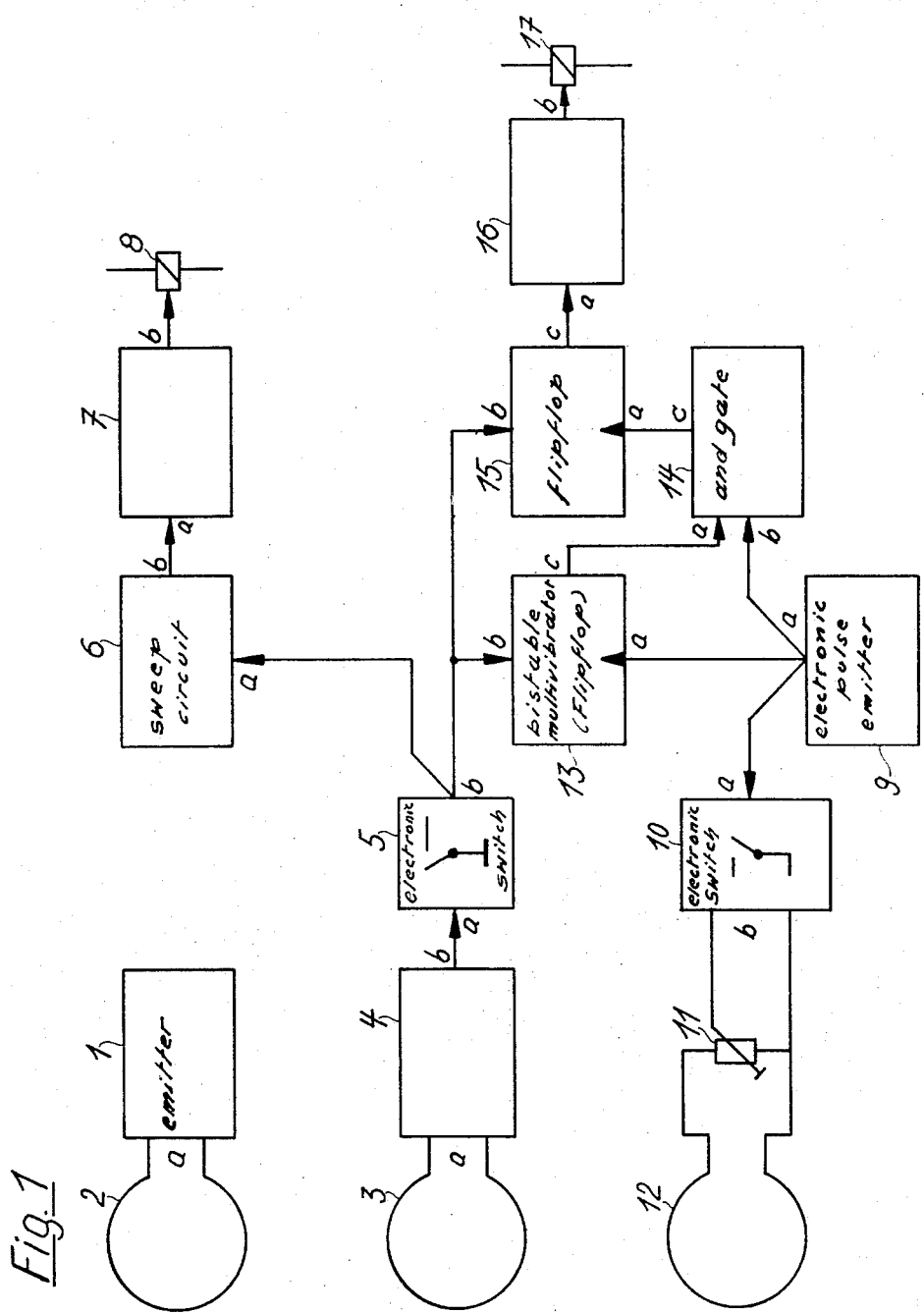
FIG. 1 shows by way of example a block diagram for a circuit arrangement according to the invention.

The problem underlying the present invention has been solved in conformity with this invention by selecting the duration of the checking pulses occurring as a result of the actuation of a switch in the receiver so that it will be less than the shortest possible duration of a pulse occurring in view of a metal object being present in the material being conveyed. The arrangement is furthermore characterized in that the checking pulses occurring in view of the actuation of the switch are separated from the pulses occurring in view of the presence of metal and conveyed to separate devices for the indication of the presence of metal and the presence of a disorder. The actuations of the switches follow each other timewise very closely so that the checking of the sensitivity of the metal detecting device can be considered continuous.

The shortest possible duration of a pulse which occurs in view of a metal object being detected in the moved material is determined by the speed of the moved material or goods or the speed of the conveyor belt and by the geometric dimensions of the metal detecting device.

Theoretically it is possible to carry out the actuation of the switch in the circuit arrangement according to the above mentioned German Democratic Republic Pat. No. 56 863 timewise in such close sequence that practically a continuous checking of the sensitivity of the metal detecting device will take place. Such an arrangement, however, would have the considerable drawback that during each checking operation proper no metal objects could be detected in view of the particularities of this circuit. A timewise too close sequence of the checking pulses will with this circuit be prohibitive. The known circuit arrangement is therefore not usable for a continuous checking of the sensitivity of a metal detecting device.

Furthermore, the circuit or control arrangement according to the invention has over heretofore known and the above mentioned circuit arrangement the great advantage that a positively finished checking operation cannot be evaluated as a metal indication. The checking of the sensitivity of the metal detecting device and of possible metal indications occur independently of each other.

A preferred embodiment of the circuit arrangement according to the invention is characterized in that the outlet of the receiver is connected to a delaying element which latter in response to the occurrence of a pulse at its inlet will, after a predetermined adjustable duration has been exceeded which is greater than the duration of the checking pulses and is shorter than the smallest possible duration of pulses occurring in view of the presence of metal objects, through further control means emit output pulses for the indication of metal. The device is furthermore characterized in that as a switch there is an electronic switch provided which is connected to an electronic pulse emitter which latter is connected with one inlet of a bistable sweep stage whereas the outlet of the receiver or of the devices following the receiver is connected to the other inlet of the bistable sweep stage. The outlet of the sweep stage is connected with the inlet of an And-gate whereas the other inlet of this And-gate is connected with the pulse emitter. The outlet of the And-gate is connected with the inlet of a further bistable sweep stage the other inlet of which is connected to the outlet of the receiver or the devices following the latter, whereas the outlet of the bistable sweep stage is connected to a control stage which controls a relay or the like for the indication of a disorder.

Referring now to the drawings in detail and FIG. 1 thereof in particular, this figure shows an emitter 1 of a metal detecting device the outlet 1a of which has connected thereto an emitter coil 2. As is well known, within the region of the electromagnetic field of the emitter coil 2 there is located a receiver coil 3 which is connected to the inlet 4a of a receiver 4. The outlet 4b of the receiver is connected to the inlet 5a of an electronic switch 5. The outlet 5b of switch 5 is connected to the inlet 6a of a delaying element 6. The outlet 6b of the delaying element 6 is connected to the inlet 7a of a monostable sweep stage 7. The outlet 7b is connected to a relay 8 which latter by means of its contacts controls non-illustrated devices for the indication of metal.

The arrangement of FIG. 1 furthermore comprises an electronic pulse emitter 9 which timewise in close sequence emits short pulses at its outlet 9a. The duration of these pulses amounts, for instance, to a few Nanoseconds, the pulses following each other, for instance, at intervals of 300 ms. The pulse emitter 9 is connected to the inlet 10a of an electronic switch 10. The outlet 10b of the electronic switch 10 is connected to a checking coil 12 through the intervention of an adjustable resistor 11.

The outlet 9a of the pulse emitter 9 is furthermore connected to the inlet 13a of a bistable sweep stage 13, whereas the other inlet 13b of the bistable sweep stage 13 is connected to the outlet 5b of the electronic switch 5. The outlet of the bistable sweep stage 13 is connected to the inlet 14a of an And-gate 14, whereas the other inlet 14b of the And-gate 14 is connected to the pulse emitter 9. The outlet 14c of the And-gate 14 leads to one inlet 15a of a bistable sweep stage 15, whereas the other inlet 15b of the bistable sweep stage 15 is connected to the outlet 5b of the electronic switch 5. The outlet 15c of the bistable sweep stage 15 is connected to the inlet 16a of a control stage 16 which serves primarily to amplify the signals coming from the outlet 15c of the bistable sweep stage 15. Connected to the outlet 16b of the control stage 16 is a relay 17 which controls non-illustrated devices for indicating a disorder.

The numbers 9a, 10a, 13a and 14b of the pulse diagram of FIG. 2 pertain to pulses 90 to 93 which are emitted by the pulse emitter 9 in time intervals of, for instance, 300 ms and are conveyed to the inlets 10a, 13a, 14b of the electronic switch 10 and the bistable sweep stage 13 and the And-gate 14 respectively. In view of these pulses, the electronic switch 10 switches for a predetermined time period to another condition so that the checking coil 12 is short-circuited during a predetermined time through the resistor 11 and the outlet 10b of the electronic switch 10 (see position 10b of the pulse diagram). If the sensitivity of the metal detecting device is sufficient, checking pulses P appear at the outlet 4b of the receiver 4 which checking pulses exceed a certain threshold value illustrated by dash lines in positions 4b, 5a of the pulse diagram. As a result thereof, the electronic switch 5 shifts into the other condition during the duration during which a checking pulse P exceeds the above mentioned threshold value as will be evident from positions 5b, 6a, 13b and 15b of the pulse diagram. In view of this switching over of the electronic switch 5, the delaying element 6 is controlled. When the electronic switch 5 remains closed for a certain minimum period of time $\tau$, the delaying element 6, designed in the manner of an integration element, will reach the threshold value which in position 6 of the pulse diagram is indicated by a dash line, and when reaching said threshold value emits through its outlet 6b a pulse to the monostable sweep stage 7. The above mentioned minimum duration is so selected that the said threshold value can be obtained only when a pulse M occurs in view of a metal object in the material being conveyed. In view of a checking pulse P, the threshold value shown in position 6 of the pulse diagram cannot be obtained so that a metal indication will not be given if only checking pulses P occur.

It may be assumed that the sensitivity of the material detecting device, at the occurrence of pulse 91 of pulse emitter 9, has dropped below the permissible limit. This means that the short-circuiting of the checking coil 12 at the outlet 5b of the electronic switch 5 has no effect so that the bistable sweep stage, in view of the pulses simultaneously present at the inlet 13a and in view of the fact that no pulse is present at the inlet 13b, has at the outlet 13c, for instance, the logical "1". The logical 1 would not appear at the outlet 13c if also at the inlet 13b of the bistable sweep stage 13 in view of the short-circuiting of the checking coil 12 there had been a pulse. When the next following pulse 92 of the pulse emitter 9 occurs, the logical 1 will be at the inlet 14a and also at the inlet 14b of the And-gate 14 so that at the outlet 14c of the And-gate 14 a signal will appear. Through the inlet 14a, the bistable sweep stage 15 is shifted to the other condition so that at the outlet 15c a signal is emitted to the inlet 16a of the control stage 16 which latter through its outlet 16b turns on the relay 17. The indication of a disorder inherent thereto will be maintained until, after sufficient sensitivity has been restored, a pulse emitted at the outlet 5b of the electronic switch 5 returns the stable sweep stage 15 through inlet 15b to its original condition.

It is possible, for instance, by means of an additional non-illustrated and correspondingly controlled electronic switch to prevent that during an indication of metal by the sweep stage 7 or relay 8 pulses are emitted by the pulse emitter 9 or reach the inlet 10a of the electronic switch 10. Such function of the control arrangement according to the invention can easily be recognized from the pulse diagram of FIG. 2.

It is, of course, to be understood that the present invention is, by no means, limited to the particular showing in the drawings but also comprises any modifications within the scope of the appended claims.

What is claimed is:

1. In circuitry arrangement always sensitive for detecting metal objects in uninterruptedly flowing non-metallic material and for continually checking the operation of the arrangement; an emitter coil and means for energizing the emitter coil to establish a field, a receiver coil linked by the field of said emitter coil, said emitter and receiver coils being so positioned relative to the flowing material that the said field will be changed by metal objects in said material, a checking coil operable when energized to change the field linking said receiver coil, pulse generating means for periodically generating checking pulses and operatively connected to said checking coil to cause the periodic energization thereof, first means connected to said receiver coil and operable to develop signals in response to changes in the field linking said receiver coil, the duration of the change in the field linking said receiver coil due to a metal object in said material being substantially greater than the duration of the said change due to the periodic energization of said checking coil, first signalling means connected to said first means and operable to develop a signal in response to a signal from said first means of a duration greater than that caused by a said periodic energization of said checking coil, electronic switching means connected between said first means and said first signalling means that serve to hinder passing along of periodically appearing checking pulses though permitting passage of impulse signals of a duration greater than that of the checking pulses, and second signalling means connected to said pulse generating means and to said first means and operable to develop a signal in response to the absence of a signal from said first means in response to the energization of said checking coil.

2. In circuitry arrangement always sensitive for detecting metal objects in uninterruptedly flowing non-metallic material and for continually checking the operation of the arrangement; an emitter coil and means for energizing the emitter coil to establish a field, a receiver coil linked by the field of said emitter coil, said emitter and receiver coils being so positioned relative to the flowing material that the said field will be changed by metal objects in said material, a checking coil operable when energized to change the field linking said receiver coil, pulse generating means for periodically generating checking pulses and operatively connected to said checking coil to cause the periodic energization thereof, first means connected to said receiver coil and operable to develop signals in response to changes in the field linking said receiver coil, the duration of the change in the field linking said receiver coil due to a metal object in said material being substantially greater than the duration of the said change due to the periodic energization of said checking coil, first signalling means connected to said first means and operable to develop a signal in response to a signal from said first means of a duration greater than that caused by a said periodic energization of said checking coil, and second signalling means connected to said pulse generating means and to said first means and operable to develop a signal in response to the absence of a signal from said first means in response to the energization of said checking coil, a first bistable circuit having an output and having an input connected to each of said first means and said pulse generating means and an And gate having an input connected to the output of said first bistable circuit and an input connected to said pulse generating means and having an output, a second bistable circuit having an output connected to said second signalling means and having an input connected to said first means and an input connected to the output of said And gate.

3. An arrangement according to claim 2 which includes delay means interposed between said first means and said first signalling means and having a delay period greater than the duration of a period of energization of said checking coil.

4. An arrangement according to claim 2 in which the interval between successive pulses from said pulse generating means is greater than the length of time that a metal object in said material will influence the field linking said receiver coil.

5. An arrangement according to claim 3 in which said delay means comprises a component which develops a sawtooth output with each rise having a duration substantially greater than the duration of the change in the field linking said receiver coil due to energization of said checking coil.

6. An arrangement according to claim 5 in which said first signalling means has a threshold which is reached by the output of said delay means only upon a said rise of greater duration than that of a rise developed in response to energization of said checking coil.

7. An arrangement according to claim 4 in which the pulses from said pulse generating means occurs at about 300 millisecond intervals whereby the checking of said arrangement is substantially continuous.

* * * * *